United States Patent
Ibrahim et al.

(10) Patent No.: US 6,907,347 B2
(45) Date of Patent: Jun. 14, 2005

(54) SYSTEMS AND METHOD FOR ESTIMATING SPEED AND PITCH SENSOR ERRORS

(75) Inventors: Faroog Abdel-Kareem Ibrahim, Dearborn, MI (US); Thomas Edward Pilutti, Ann Arbor, MI (US); Nizar Alholou, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 197 days.

(21) Appl. No.: 10/065,806

(22) Filed: Nov. 21, 2002

(65) Prior Publication Data

US 2004/0102900 A1 May 27, 2004

(51) Int. Cl.[7] .............................................. G01C 21/00
(52) U.S. Cl. ........................ 701/215; 701/34; 701/214; 342/358
(58) Field of Search ............................ 701/29, 34, 214, 701/215; 342/357.14, 358

(56) References Cited

U.S. PATENT DOCUMENTS

| | | | |
|---|---|---|---|
| 5,928,309 A | | 7/1999 | Korver et al. |
| 6,029,106 A | * | 2/2000 | Hale et al. ................. 701/50 |
| 6,029,111 A | * | 2/2000 | Croyle ..................... 701/207 |
| 6,708,115 B1 | * | 3/2004 | Nagasaka et al. ........... 701/214 |
| 6,751,535 B2 | * | 6/2004 | Mori ........................ 701/23 |

FOREIGN PATENT DOCUMENTS

| | | |
|---|---|---|
| JP | 11-037776 | 2/1999 |
| JP | 11-118499 | 4/1999 |
| JP | 11-304904 | 11/1999 |
| JP | 11-325927 | 11/1999 |

OTHER PUBLICATIONS

"An Examination of the Relative Merits of Various Sensors for Vehicle Navigation", by Eric Abbott et al., Proceedings of ION GPS–95, pt. 1, 1995, pp. 1269–1284, Stanford University.

* cited by examiner

*Primary Examiner*—Gary Chin
(74) *Attorney, Agent, or Firm*—Brooks Kushman PC; Damian Porcari

(57) ABSTRACT

Systems and methods for estimating the bias and scale factor in a speed sensor and pitch sensor using a modified adaptive filter. A filter learns adaptively in a random manner to estimate the errors in the vehicle speed and pitch angle. The aiding measurements used in this approach are exemplarily DGPS travel distances. The filter adaptively estimates error source values during the availability of DGPS, and can then use these estimates to aid an INS during DGPS outages.

21 Claims, 2 Drawing Sheets

SYSTEMS AND METHOD FOR ESTIMATING SPEED AND PITCH SENSOR ERRORS

BACKGROUND OF INVENTION

1. Field of the Invention

The present invention relates generally to vehicle navigation systems, and more particularly, to systems and methods for estimating the bias and scale factor in a speed sensor and pitch sensor using a modified adaptive filter.

2. Background of the Invention

Many navigation systems rely on satellite-based global positioning ("GPS") devices, including at least a number of which have been applied in automobile navigation systems. Conventional methods for correcting GPS positions are referred to as differential GPS ("DGPS").

Integrated navigation systems ("INS") are employed within vehicles in order to provide vehicle position and velocity information with respect to a specified reference frame. A typical INS determines estimates for the position and velocity of a vehicle based on a collection of data taken from inertial sensors such as acceleration and rate sensors mounted in the vehicle, as well as sensors based outside the vehicle, such as a GPS. Typically, the INS will use this sensed information, along with a model of vehicle motion behavior to form a set of navigation equations, in order to estimate vehicle position information and derivations therefrom. Conventional INS may be used in "turn-by-turn navigation" systems, "in vehicle dynamics" systems, and within proposed vehicle enhancements such as "adaptive cruise control." A key element and/or function of the INS is the estimation of sensor errors used in the navigation equations. All sensors used by the INS have a scale factor that relates the sensor output to the sensed attribute, and a bias error; i.e., the sensor has a nonzero output even when the sensed attribute is zero. If the bias error or scale factor estimates are calculated incorrectly, the calculated vehicle position, heading, and/or speed will be in error, and the reliability of the INS will be undesirably reduced. This sensor error estimation is especially important in situations where data from the GPS may become unavailable such as under bridges or within tunnels.

Efforts have been made to reduce the impact of the scale factor and bias error estimation through the use of high quality inertial measurement equipment. However, the relatively high cost of such equipment is prohibitive for automotive applications. Hence, sensor error estimation is critical in conventional systems utilizing lower quality sensors. Conventional sensor error estimation is typically performed by developing sensor error models, and then implementing the model parameter estimation as augmented equations in the overall set of navigation equations, usually in a "Kalman" filter. The Kalman filter approach has desirable stability properties, but is somewhat limited, as it provides only statistical representations of errors, and requires the implementation to be added to the overall navigation equations. Other attempts at estimating these types of sensor errors have been made using neural networks. While neural networks have the advantage of learning in the presence of noise, they often require a relatively large number of learning examples, referred to as a training set, which are needed for the training phase. The required "training" process is relatively complicated, time consuming, and computationally intensive, and is therefore not suited to be carried out "on-line" or during the normal use of a vehicle.

What is needed are systems and methods for estimating bias and scale factor in speed and pitch sensors within an integrated navigation system.

SUMMARY OF INVENTION

In one embodiment, the present invention provides systems and methods for estimating the bias and scale factor in a speed and pitch sensor using a modified adaptive filter. The adaptive filter estimates errors in a vehicle's speed and pitch angle during the availability of DGPS, and can use these estimated values to aid the INS during DGPS outages or unsuitable DGPS solutions. The systems and methods of the present invention may be applied successfully to navigation problems, such as in automotive applications.

In a preferred embodiment, the present invention provides a system for estimating an error in a first sensor. The system includes a first sensor that generates a first signal, a second sensor that generates a second signal, a module communicatively coupled to the first and second sensors, and an adaptive filter communicatively coupled to the module. The module generates values based on signals received from the first and second sensors, and combines those values to generate a third value. The adaptive filter receives the first value and the third value, and estimates the error in the first sensor based upon those values. The sensors include speed, pitch, differential global positioning system, and an integrated navigation system. The errors include scale and bias errors.

In a preferred embodiment, the present invention provides a method for performing a position calculation using an estimate of an error in a sensor. The method comprises obtaining a plurality of signals from a sensor during a predetermined period of time, estimating the error using a filter that receives signals, storing the estimate of the error in a module communicatively coupled to the filter, and utilizing the estimate of the error to perform a position calculation during a period of time.

DETAILED DESCRIPTION

Figure 1:
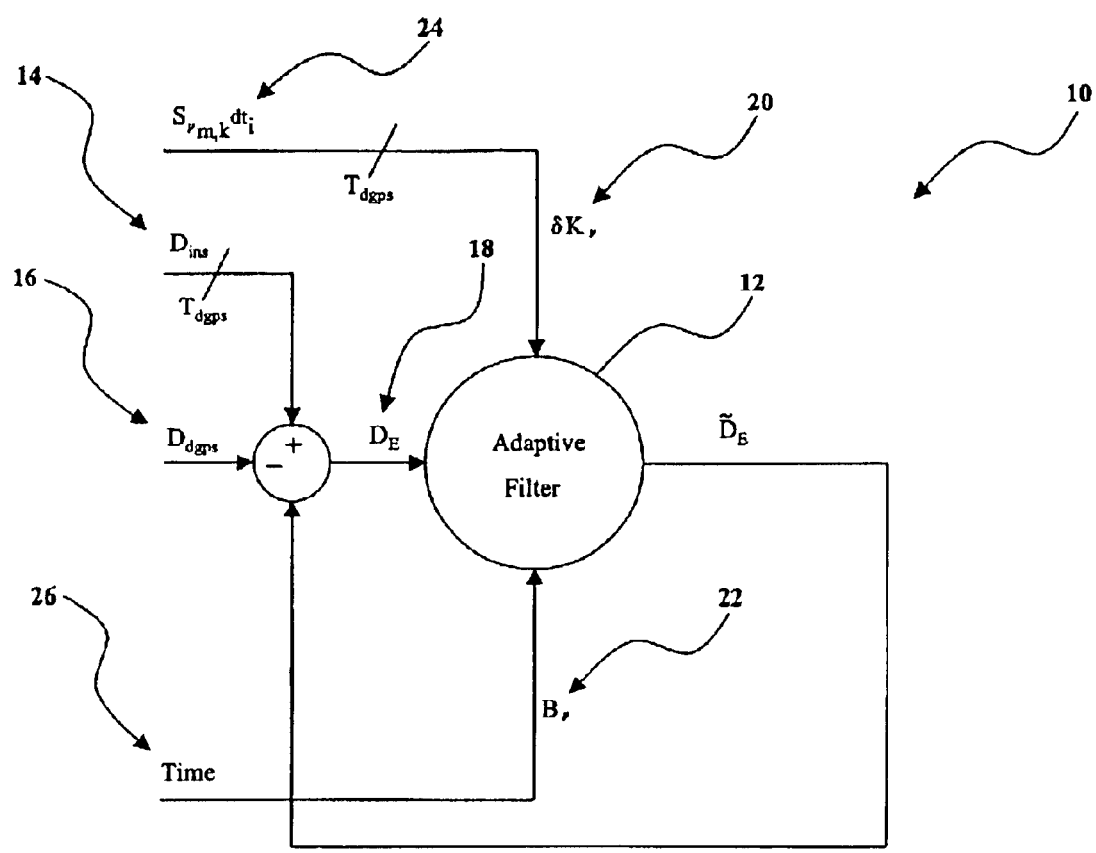
FIG. 1 is a functional block diagram illustrating one embodiment of a linear neuron design used by the system for estimating sensor errors which is made in accordance with the teachings of the preferred embodiment of the present invention.

As discussed above, an integrated navigation system (INS) may be utilized within a vehicle, such as an automobile, to provide vehicle position information and vehicle velocity information with respect to a predetermined frame of reference. Typically, an INS estimates the position and velocity of a vehicle based on a plurality of data received from inertial sensors, such as acceleration sensors and rate sensors, disposed within the vehicle, as well as sensors located outside of the vehicle, such as a differential global positioning system (DGPS). Typically, the INS utilizes this sensor information, along with a model of vehicle motion behavior, to form a plurality of navigation equations utilized to estimate vehicle position and derivatives thereof. A key element in and/or function of the INS is the estimation of sensor errors taken into account by the navigation equations.

In general, the present invention provides systems and methods for estimating the scale factor and the bias factor of a speed sensor and a pitch sensor of an INS. A scale factor relates the output of a given sensor to the sensed attribute.

A bias factor relates to the fact that a given sensor may have a non-zero output even when the sensed attribute is zero. These systems and methods utilize a modified adaptive filter. The filter learns adaptively, in a random manner, to estimate errors in vehicle speed and pitch angle calculations. The aiding measurement utilized by these systems and methods is DGPS travel distance. The filter is operable for adaptively estimating speed measurement and pitch measurement error source values during the availability of DGPS service and DGPS travel distance measurements. These estimates may then be utilized by the INS during DGPS service outages or in the event of unsuitable DGPS solutions. In other words, the filter is operable for generating a scale factor/bias factor model, during vehicle operation and during the availability of DGPS service and DGPS travel distance measurements, that may be utilized by the INS and the associated speed sensor(s) and pitch sensor(s), during the unavailability of DGPS service and DGPS travel distance measurements. Thus, the systems and methods of the present invention allow an INS to function properly at virtually all times, and provide a means for solving the navigation problem. These systems and methods may be applied to any navigation application, such as an automotive navigation application, that utilizes speed sensors, pitch sensors, or both.

In one embodiment, a system for estimating the scale factor and the bias factor of a speed sensor and a pitch sensor of an INS includes all or a portion of the INS communicatively coupled to an adaptive filter. As is well known by those of ordinary skill in the art, the INS may include a processor and one or more memory devices. The present invention is embodied in a microprocessor based system that utilizes arithmetic units to control processes according to software programs. Typically, the programs are stored in read-only memory, random access memory, or the like. The present invention is particularly well adapted for use with any conventional microprocessor based system. The software program may be readily coded using any conventional computer language. The process of writing software code is a mere mechanical step for one skilled in the art. The INS is also preferably in communication with a plurality of sensors and systems that transmit signals which are received by the INS. These sensors and systems may include, for example, a speed sensor, a pitch sensor, and a DGPS.

The speed sensor and the pitch sensor in communication with the INS of the vehicle have two primary sources of error: a scale factor and a bias factor. In operation, if the scale factor and the bias factor are not measured, calculated, or estimated correctly, the reliability of the INS may be reduced and the apparent position of the vehicle may be in error. This is especially true in INS's utilizing lower-quality speed sensors and pitch sensors. As discussed above, the DGPS service may periodically become unavailable, such as when the vehicle passes under a bridge or other structure or, for example, enters a tunnel. At such times, direct measurements of the scale factor and the bias factor are unavailable, and estimates must be relied upon.

The x-y INS travel distance ($D_{ins}$) is represented by the following equation:

$$D_{ins_k} = D_{ins_{k-1}} + V_{k-1} \cos \theta_{k-1} dt_i. \quad (1)$$

The x-y DGPS travel distance ($D_{dgps}$) is represented by the following equation:

$$D_{dgps_k} = D_{dgps_{k-1}} + \sqrt{(x_k - x_{k-1})^2 + (y_k - y_{k-1})^2}. \quad (2)$$

The DGPS travel distance is utilized as the aiding measurement by the INS for estimating the scale factor and the bias factor of the speed sensor and the pitch sensor during DGPS service outages or in the event of unsuitable DGPS solutions because the DGPS travel distance is independent of the heading angle of the vehicle.

The pitch angle ($\theta$) is represented by the following equation:

$$\theta_k = \alpha \tan(-(h_k - h_{k-1})/\sqrt{(x_k - x_{k-1})^2 + (y_k - y_{k-1})^2}). \quad (3)$$

Thus, $$\theta_k = \alpha \tan(-v_x/\sqrt{v_x^2 + v_y^2}). \quad (4)$$

The sensor area model is represented by the following equation:

$$D_{E_k} = D_{E_m} + \delta K_{vc_{mk}} S_{v_m,k} dt_i + B_{vc_{mt1}} T + S_{n_o,k} dt_i, \quad (5)$$

where $D_E$ is the error in the open loop x-y INS travel distance, $\delta K_v$s the scale factor of a given speed sensor, B $B_V$ is the bias factor of the speed sensor, and $S_V$ is the sum of the velocities-pitch angle product between two epochs.

Figure 2:
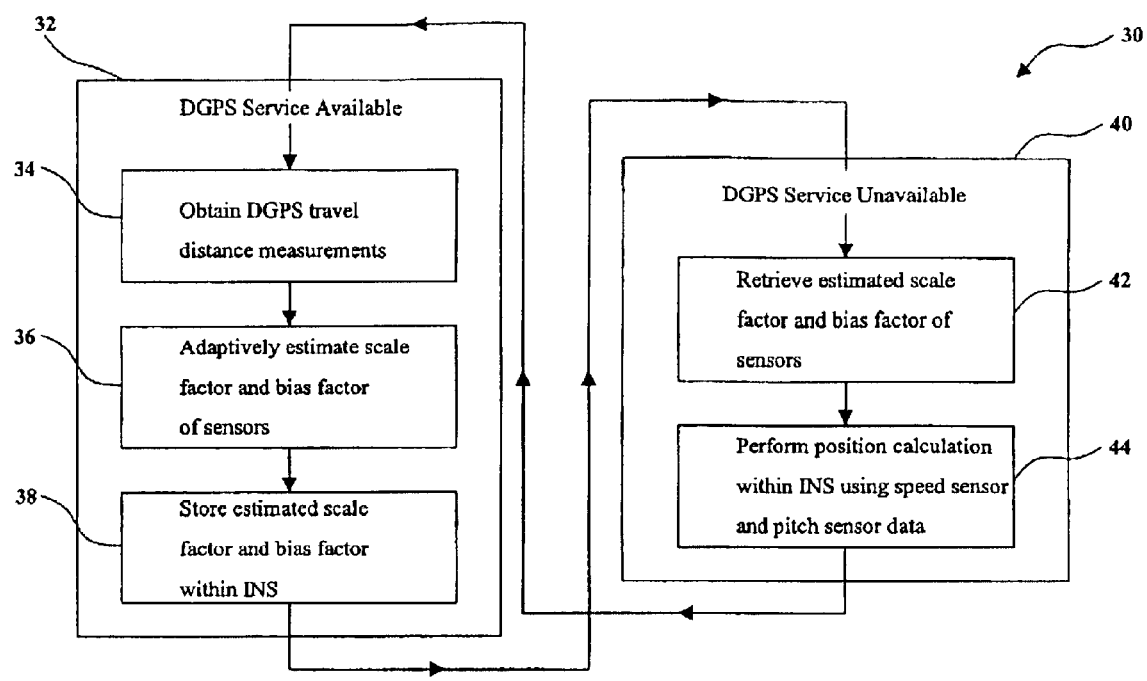
FIG. 2 is a functional block diagram illustrating one embodiment of a method for estimating the scale factor and the bias factor of a speed sensor and a pitch sensor of an INS.

Referring to FIG. 1, in one embodiment, the adaptive filter design 10 of the present invention simulates equation (5) and utilizes a modified adaptive filter 12. As discussed above, the filter 12 learns adaptively, in a random manner, to estimate errors in vehicle speed and pitch angle calculations. The desired target is the open loop x-y INS travel distance ($D_{ins}$) 14 minus the x-y DGPS travel distance ($D_{dgps}$) 16, which represents the error in the open loop x-y INS travel distance ($D_E$) 18. The weights are the estimated scale factor ($\delta K$) 20 and the estimated bias factor (B) 22, and the inputs are the pitch rate sum (S) 24 and time 26. A bias input value of one (1) preferred if T is the time calculated from zero (0). This is necessary to estimate the initial error in the open loop x-y INS travel distance. The estimated scale factor and bias factor are fed back into the INS to predict the error in the INS position for the next DGPS period. The adaptive filter design 10 of the present invention dynamically integrates INS and DGPS utilizing a linear neuron, thereby automatically and effectively eliminating errors in the vehicle speed measurements and pitch measurements Referring to FIG. 2, in one embodiment, a method 30 for estimating the scale factor and the bias factor of a speed sensor and a pitch sensor of an INS comprises, during the availability of DGPS service 32, obtaining a plurality of DGPS travel distance measurements (Block 34). Utilizing these DGPS travel distance measurements, a modified adaptive filter is utilized to adaptively estimate the scale factor and the bias factor for the speed sensor and the pitch sensor of the INS (Block 36). These scale factors and bias factors are then stored within the INS (Block 38). During DGPS service outages or in the event of unsuitable DGPS solutions 40, the adaptively estimated scale factor and bias factor are retrieved by the speed sensor and the pitch sensor (Block 42) and are used by the INS to perform position calculations (Block 44).

Although the present invention has been described with reference to preferred embodiments and examples thereof, other embodiments may achieve the same results. Variations in and modifications to the present invention will be apparent to those of ordinary skill in the art and the following claims are intended to cover all such equivalent embodiments.

What is claimed is:

1. A system for estimating an error in a first sensor, the system comprising:
   a first sensor operable for generating a first signal;
   a second sensor operable for generating a second signal;
   a module communicatively coupled to the first sensor and the second sensor, wherein the module comprises a first portion operable for generating a first value based upon the first signal received from the first sensor, a second portion operable for generating a second value based upon the second signal received from the second sensor, and a third portion operable for combining the first value and the second value to generate a third value; and
   an adaptive filter communicatively coupled to the module, the adaptive filter operable for receiving the first value and the third value and estimating the error in the first sensor based upon the first value and the third value.

2. The system of claim 1, wherein the first sensor comprises a speed sensor.

3. The system of claim 1, wherein the first sensor comprises a pitch sensor.

4. The system of claim 1, wherein the second sensor comprises a differential global positioning system (DGPS).

5. The system of claim 1, wherein the module comprises at least a portion of an integrated navigation system (INS).

6. The system of claim 1, wherein the first, second, and third values comprise travel distance values.

7. The system of claim 1, wherein the error comprises a scale factor.

8. The system of claim 1, wherein the error comprises a bias factor.

9. A system for estimating an error in a first sensor, the system comprising:
   a first sensor operable for generating a first signal;
   a differential global positioning system (DGPS) operable for generating a second signal;
   a integrated navigation system (INS) communicatively coupled to the first sensor and the DGPS, wherein the INS comprises a first portion operable for generating a first travel distance value based upon the first signal received from the first sensor, a second portion operable for generating a second travel distance value based upon the second signal received from the DGPS, and a third portion operable for combining the first travel distance value and the second travel distance value to generate a third travel distance value; and
   an adaptive filter communicatively coupled to the INS, the adaptive filter operable for receiving the first travel distance value and the third travel distance value and estimating the error in the first sensor based upon the first travel distance value and the third travel distance value.

10. The system of claim 9, wherein the first sensor comprises a speed sensor.

11. The system of claim 9, wherein the first sensor comprises a pitch sensor.

12. The system of claim 9, wherein the error comprises a scale factor.

13. The system of claim 9, wherein the error comprises a bias factor.

14. A method for estimating an error in a first sensor, the method comprising:
   generating a first signal using the first sensor;
   generating a second signal using a second sensor;
   communicating the first signal and the second signal to a module coupled to the first sensor and the second sensor, wherein the module comprises a first portion operable for generating a first value based upon the first signal received from the first sensor, a second portion operable for generating a second value based upon the second signal received from the second sensor, and a third portion operable for combining the first value and the second value to generate a third value;
   receiving the first value and the third value using an adaptive filter coupled to the module; and
   estimating the error in the first sensor based upon the first value and the third value.

15. The method of claim 14, further comprising selecting the first sensor to be a speed sensor.

16. The method of claim 14, further comprising selecting the first sensor to be a pitch sensor.

17. The method of claim 14, further comprising selecting the second sensor to be a differential global positioning system (DGPS).

18. The method of claim 14, further comprising selecting the module to include at least a portion of an integrated navigation system (INS).

19. The method of claim 14, further comprising selecting the first, second, and third values to be travel distance values.

20. The method of claim 14, further comprising selecting the error to be a scale factor.

21. The method of claim 14, further comprising selecting the error to be a bias factor.

* * * * *